(12) United States Patent
Neefeldt et al.

(10) Patent No.: US 6,799,455 B1
(45) Date of Patent: Oct. 5, 2004

(54) VEHICLE TIRE AIR MONITOR

(75) Inventors: Edward F. Neefeldt, 20 Lanning Blvd.-Apt. 215, East Windsor, NJ (US) 08520; David Lundquist, Stony Brook, NY (US)

(73) Assignee: Edward F. Neefeldt, East Windsor, NJ (US)

( * ) Notice: Subject to any disclaimer, the term of this patent is extended or adjusted under 35 U.S.C. 154(b) by 0 days.

(21) Appl. No.: 10/309,888

(22) Filed: Dec. 5, 2002

Related U.S. Application Data

(63) Continuation-in-part of application No. 09/924,455, filed on Aug. 9, 2001, now abandoned.

(51) Int. Cl.[7] ............................................. G01M 17/02
(52) U.S. Cl. ....................................... 73/146; 73/146.8
(58) Field of Search ................................ 73/146–146.8

(56) References Cited

U.S. PATENT DOCUMENTS

| | | | |
|---|---|---|---|
| 1,804,209 A | 5/1931 | Cowperthwait | |
| 2,149,555 A | 3/1939 | Smith | 200/58 |
| 2,574,791 A | 11/1951 | Kroll | 200/58 |
| 2,727,221 A | 12/1955 | Sprigg | 340/58 |
| 3,430,196 A | 2/1969 | Dalton | 340/58 |
| 3,938,078 A | 2/1976 | Davis et al. | 340/58 |
| 3,982,225 A | 9/1976 | Schlanzky | 340/58 |
| 4,037,192 A | 7/1977 | Cowit | 340/58 |
| 4,048,614 A | 9/1977 | Shumway | 340/58 |
| 4,286,253 A | 8/1981 | Nagy | 340/58 |
| 4,319,220 A * | 3/1982 | Pappas et al. | 340/447 |
| 4,363,020 A | 12/1982 | Venema | 340/58 |
| 4,414,843 A | 11/1983 | Kounkel et al. | 73/66 |
| 4,468,650 A | 8/1984 | Barbee | 340/58 |
| 4,726,223 A | 2/1988 | Huang | 73/146.8 |
| 4,734,674 A | 3/1988 | Thomas et al. | 340/58 |
| 4,816,802 A | 3/1989 | Doerksen et al. | 340/447 |
| 5,040,561 A | 8/1991 | Achterholt | 137/227 |
| 5,289,160 A | 2/1994 | Fiorletta | 340/447 |
| 5,774,048 A | 6/1998 | Achterholt | 340/447 |
| 5,837,891 A | 11/1998 | Bridge | 73/146.8 |
| 5,987,980 A | 11/1999 | Mangafas et al. | 73/146.8 |
| 6,005,480 A | 12/1999 | Banzhof et al. | 340/447 |
| 6,011,463 A | 1/2000 | Cormier, Sr. | 340/447 |

* cited by examiner

*Primary Examiner*—Edward Lefkowitz
*Assistant Examiner*—Jermaine Jenkins
(74) *Attorney, Agent, or Firm*—Jacobson Holman PLLC

(57) ABSTRACT

A tire pressure monitor continuously indicating to a vehicle operator whether or not each tire on the vehicle, including a spare if present, is adequately inflated for safe "over-the-road" operation. The monitor includes an indicator associated with each tire to indicate when the air pressure in any individual tire on the vehicle is not inflated to a pressure adequate for safe operation. The monitor also includes a battery operated pressure sensitive radio frequency transmitter mounted on the outer end of a conventional tire valve stem and includes an antenna extending into each tire for transmitting a signal to an indicator assigned to each tire without interference from metal wheel components. The indicators are mounted on the instrument panel or dashboard of the vehicle. The signal transmitted from the transmitter on each tire valve actuates only the indicator associated with and receiving a signal from only the transmitter assigned to each tire.

10 Claims, 4 Drawing Sheets

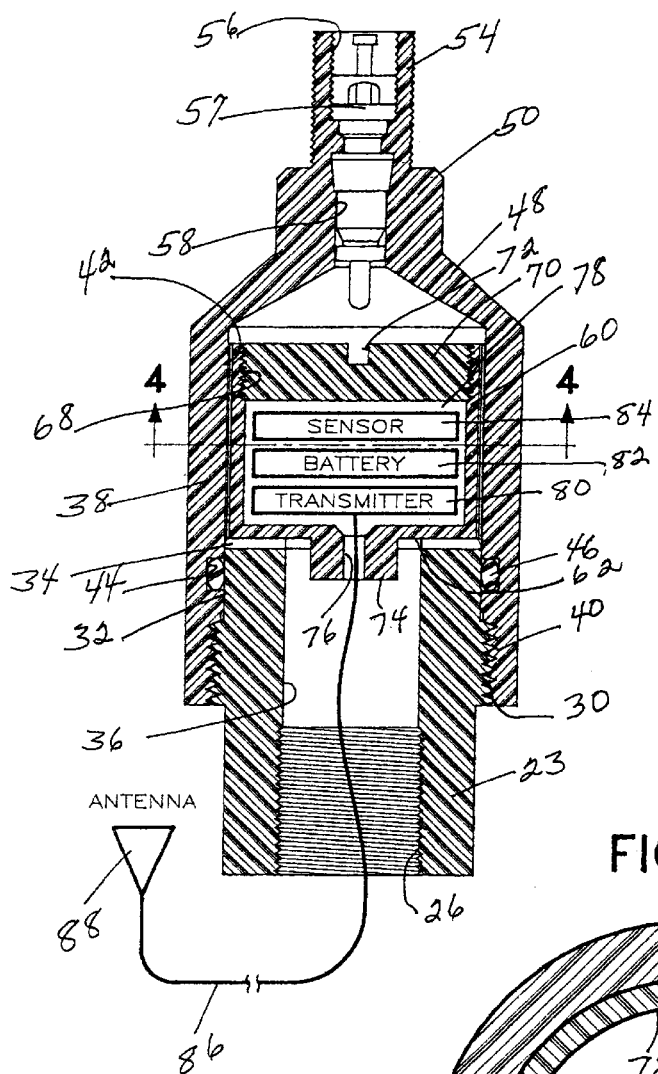
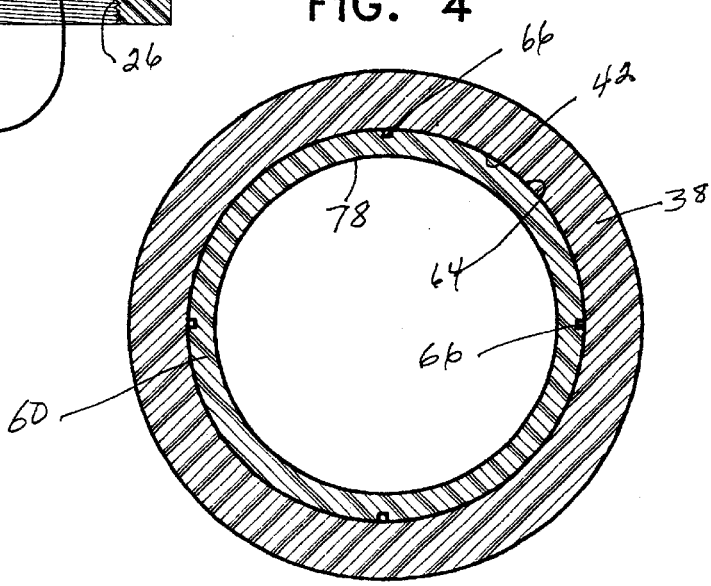

VEHICLE TIRE AIR MONITOR

CROSS REFERENCE TO RELATED APPLICATION

This application is a continuation-in-part of U.S. application Ser. No. 09/924,455 filed Aug. 9, 2001, entitled Vehicle Tire Air Monitoring System now abandoned.

BACKGROUND OF THE INVENTION

1. Field of the Invention

The present invention generally relates to tire air pressure monitors and more specifically to a monitor for continuously indicating to a vehicle operator that each tire on the vehicle, including a spare, if present, is adequately inflated for safe "over-the-road" operation. The invention also includes an indicator associated with each tire when the air pressure in any individual tire on the vehicle is not inflated to a pressure adequate for safe operation. The monitor includes a housing enclosing a pressure sensitive sensor, battery and radio frequency transmitter threadedly mounted on an outer threaded end of a conventional tire valve stem from which the Schrader valve element has been removed. The transmitter includes an antenna which extends into the interior of the tire for transmitting a signal to an indicator on the instrument panel or dashboard of the vehicle. The outer end of the housing has a conventional Schrader valve therein and the structure of the monitor enables air flow therethrough which permits inflation or deflation of the tire without removing the monitor. The signal transmitted from each transmitter to the receiver actuates only the indicator on the instrument panel associated with and receiving a signal from the transmitter monitoring the air pressure in the specific tire to which the indicator is assigned. The radio frequency transmitter and receiver enable a vehicle operator to observe an indicator for each tire so that the operator can determine whether each tire is adequately or inadequately inflated for safe operation of the vehicle.

2. Description of the Prior Art

The following U.S. patents, known to Applicant, disclose devices which relate to the invention disclosed in this application.

| | | |
|---|---|---|
| 1,804,209 | 4,048,614 | 5,040,561 |
| 2,149,555 | 4,286,253 | 5,289,160 |
| 2,574,791 | 4,363,020 | 5,774,048 |
| 2,727,221 | 4,414,843 | 5,987,980 |
| 3,430,196 | 4,468,650 | 6,005,480 |
| 3,938,078 | 4,726,223 | |
| 3,982,225 | 4,734,674 | |

The prior art in this field of endeavor discloses various devices associated with the tire valves or tires of vehicles to provide an indication of air pressure in each vehicle tire. The prior art devices include pressure sensitive switch mechanisms in each tire valve or valve stem wired individually to indicators on the instrument panel of a vehicle. The prior art also discloses pressure sensitive switches associated with vehicle tires to actuate a transmitter which transmits a wireless signal to an antenna on the vehicle associated with an indicator on the instrument panel or dashboard of the vehicle to indicate to the vehicle operator that a particular tire has an inadequate air pressure for safe operation of the vehicle.

The prior art does not disclose a monitor including a housing for a sensor, a transmitter and battery positioned therein with the housing being threadedly mounted on a tire inflation valve or valve stem from which the Schrader valve has been removed. The prior art also does not disclose a tire air pressure monitor in which the housing attached to the tire valve includes a Schrader valve in the outer end thereof with the components within the housing being constructed so that air can flow therethrough to enable inflation or deflation of the tire without removing the monitor. Additionally, the prior art does not disclose a transmitter having an antenna within the tire for wireless transmission of a radio frequency signal assigned to a particular tire to a receiver located within the cab of the vehicle and connected to an indicator actuated only by the transmitter in the tire to which a particular indicator is assigned to indicate whether the tire is either adequately inflated or inadequately inflated for safe operation of the vehicle.

SUMMARY OF THE INVENTION

The vehicle tire air pressure monitor of the present invention provides the operator of the vehicle with a separate continuous signal related to each tire on the vehicle, including a spare if present. Specifically, the monitor signals the operator whether each tire is adequately inflated for safe operation or each tire has an inflation pressure inadequate for safe operation of the vehicle. The monitor for each tire includes a pressure sensitive sensor, battery and transmitter utilizing radio frequency technology for wireless transmission of a signal to an indicator located within the cab of a vehicle for observation by the vehicle operator to indicate the inflation condition of each tire. The number of transmitters and indicators is the same as the number of tires on the vehicle. The indicators observable by the vehicle operator are associated with the monitor transmitters on the wheels on the vehicle thereby enabling the vehicle operator to receive an immediate warning when an indicator changes from indicating a safe operating air pressure in the tire to an unsafe air pressure in the tire with which the indicator is associated.

Accordingly, an object of the present invention is to provide a vehicle tire air pressure monitor for independently monitoring the air pressure in each tire on the vehicle and transmitting this information to receivers in the vehicle cab to actuate visual indicators thereby enabling an operator of the vehicle to immediately determine whether air pressure in each tire is adequate or inadequate for safe operation of the vehicle.

Another object of the present invention is to provide a monitor in accordance with the preceding object in which each transmitter is associated with a sensor and battery within the interior of a housing threadedly mounted on the outer end of an inflation valve for the vehicle tire. The transmitter includes a flexible antenna which extends into the interior of the tire to enable transmission of a radio frequency signal without interference from the tire rim or wheel.

A further object of the present invention is to provide a monitor for vehicular tire air pressure in accordance with the preceding objects in which the indicators observable by a vehicle operator are mounted in the instrument panel or dashboard of the vehicle with each indicator being assigned to and receiving transmitted radio frequency signals from one particular tire with the indicators including a green light indicating safe operating pressure of the tire and a red light indicating low and unsafe air pressure in the tire.

Still another object of the present invention is to provide a monitor for vehicle tire air pressure in accordance with the preceding objects in which the radio frequency transmitter and receiver utilize frequencies having characteristics in which the wireless transmitted signals are insufficient to cause interference with other radio frequency signals oriented externally of the vehicle on which the monitor is mounted.

Yet another object of this invention to be specifically enumerated herein is to provide a vehicle tire air pressure monitor in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a vertical sectional view of the monitor shown in FIG. 2 and illustrating the internal structure thereof.

FIG. 4 is a transverse sectional view, on an enlarged scale, taken along section line 4—4 in FIG. 3, illustrating external grooves on an internal component of the invention.

DESCRIPTION OF THE PREFERRED EMBODIMENT

Figure 1:
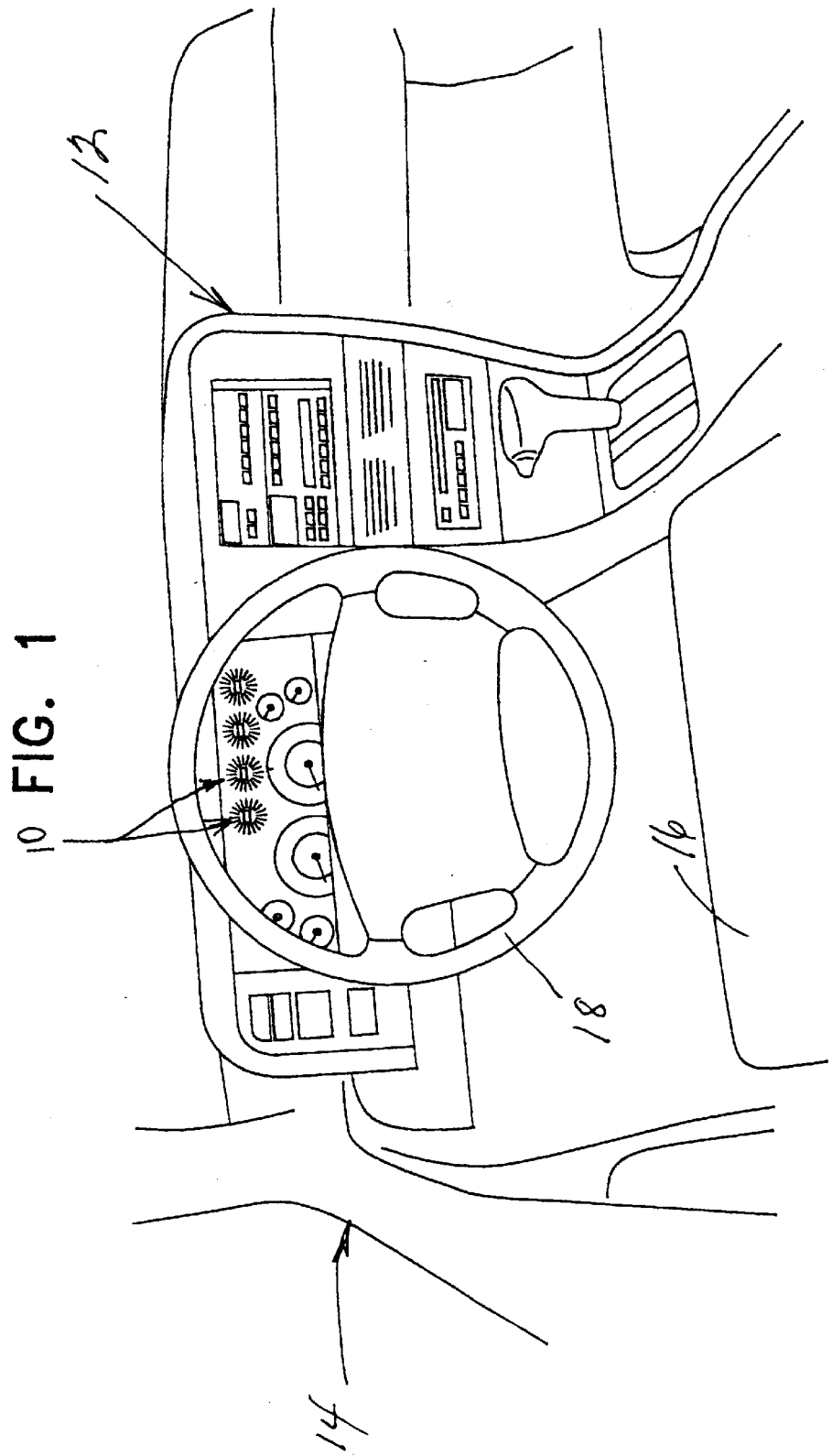
FIG. 1 is a schematic illustration of a vehicle instrument panel with multiple indicators mounted thereon in accordance with the present invention.
Figure 2:
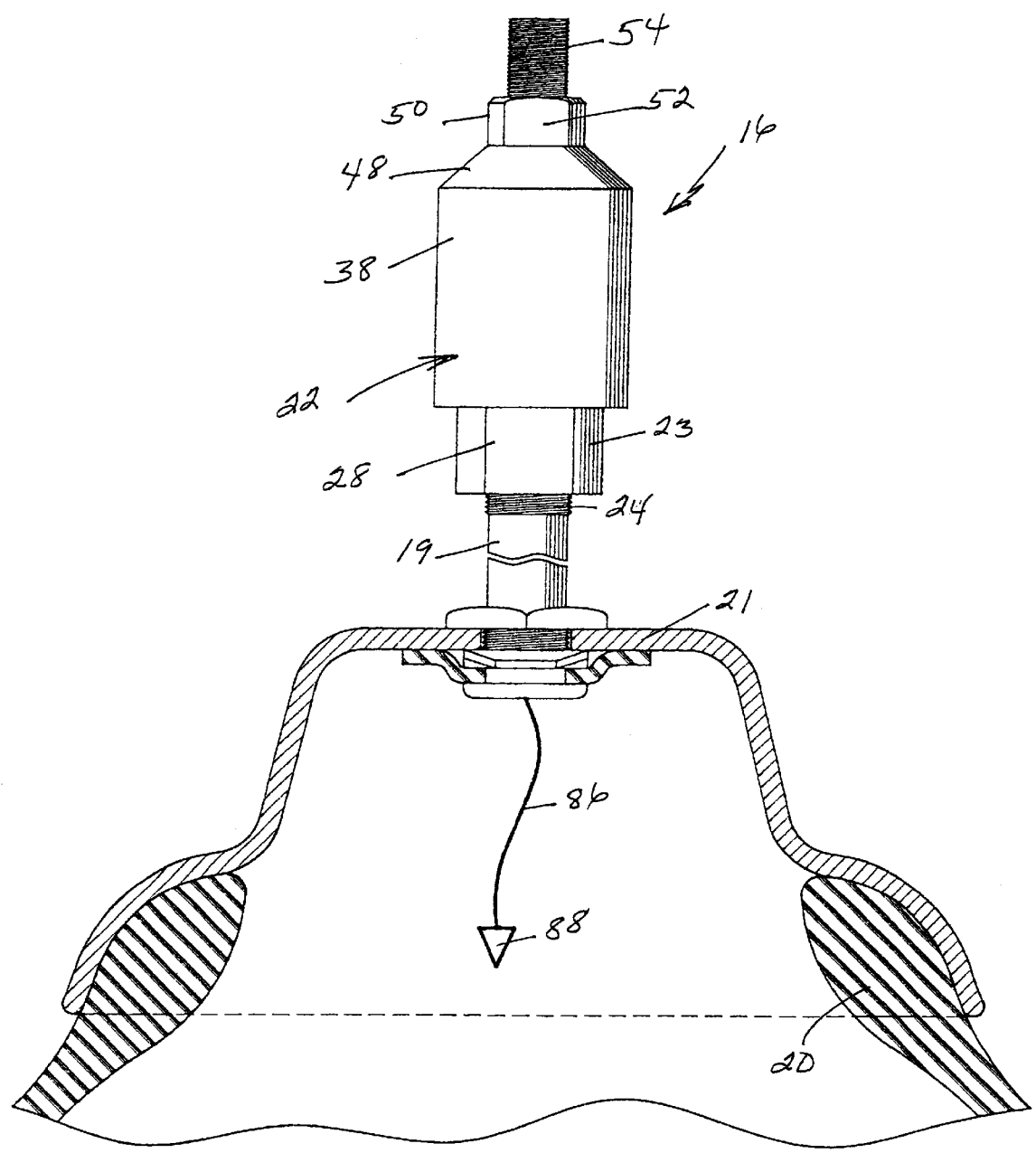
FIG. 2 is a schematic elevational view of an air valve stem having a monitor in accordance with the present invention screw threadedly mounted on the outer end of a valve stem in a tire and rim assembly.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

As illustrated in FIG. 1, indicators 10 forming part of a tire air pressure monitoring system of the present invention are positioned in the instrument panel or dashboard 12 of a vehicle cab generally designated by reference numeral 14. Preferably, the indicators 10 are positioned so that a vehicle operator occupying the operator's seat 16 rearwardly of the steering wheel 18 can observe the indicators 10 which are located in any position generally forwardly of the vehicle operator to enable quick and easy visual observation of the indicators 10 without any substantial distraction of the vehicle operator from observing road and traffic conditions to enable the vehicle operator to safely operate the vehicle and observe the indicators 10.

FIGS. 2–5 illustrate a monitor generally designated by reference numeral 16 for tire air pressure constructed in accordance with the present invention. The monitor 16 is mounted on a conventional air valve stem 19 extending through and sealingly engaged with a metal rim 21 on which a tire 20 is mounted. The monitor 16 includes a housing generally designated by reference numeral 22 having an internally screw threaded lower member 23 screw threaded onto a shortened upper screw threaded end 24 of the valve stem 19 from which the Schrader valve core has been removed. As illustrated in FIG. 3, the lower member 23 is internally threaded at 26 and includes external opposed flat areas 28 for engagement by a wrench or other suitable tool when attaching or removing the monitor 16 from the valve stem 19. The lower member 23 also includes an externally threaded area 30 immediately above the flat areas 28 and a smooth external peripheral area 32 above the threaded area 30.

Figure 5:
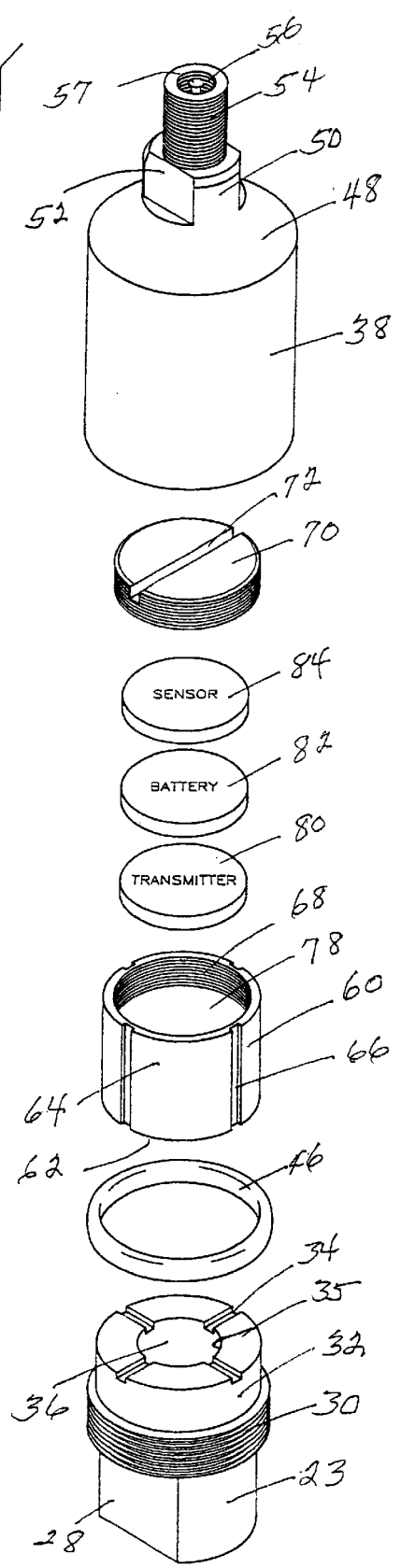
FIG. 5 is an exploded perspective view of the monitor illustrating structural detail thereof.

As illustrated in FIGS. 3 and 5, the upper end surface of the lower member 23 includes a plurality of radial grooves 34. The radial grooves 34 extend from the upper outer peripheral edge of the extended peripheral area 32 to an upper peripheral edge 35 of an internal, generally cylindrical passageway 36. The passageway 36 extends throughout the length of the lower member 23 thereby communicating the interior of the tire 20 with the exterior of the upper end of the lower member 23.

The housing 22 also includes a generally cylindrical, tubular upper member 38 which has an internally threaded lower end area 40 for screw threaded engagement with threaded area 30 on the lower member 23. The upper member 38 includes a smooth internal cylindrical area 42 above the threaded area 40. A peripheral internal groove 44 is provided in the area 42 at the upper end of threaded area 40 for receiving an O-ring seal 46 which sealingly engages the external surface of the upper end of the smooth peripheral area 32 of lower member 23 when the lower member 23 and upper member 38 are screw threadedly assembled. The upper end of upper member 38 inclines or tapers inwardly at 48 to a cylindrical upper end 50 on the upper member 38. The cylindrical upper end 50 has a diameter substantially less than the diameter of the upper member 38 and has flat areas 52 to receive a wrench or other tool to enable assembly and disassembly of the lower member 23 and upper member 38 by use of the threaded areas 30 and 40.

Projecting upwardly from the upper end 50 of upper member 38 is a smaller diameter tubular externally and internally threaded extension 54 adapted to receive a conventional valve stem cap (not shown). The threaded interior surface 56 of extension 54 is in communication with an internal bore 58 in cylindrical upper end 50. The bore 58 and threaded interior surface 56 are configured to threadably receive a Schrader valve core 57 to retain air pressure within the tire 20 and housing 22. The Schrader valve core 57 that was removed from the valve stem 19 may be inserted into the extension 54 with the threads 56 engaging the externally threaded surface of the Schrader valve core 57 in a manner well known. Preferably, a new Schrader valve core is used to assure positive valve closure and long lasting operation.

Fitted in the interior of the upper member 38 is a rigid cylindrical tubular casing 60 positioned in the smooth interior area 42 of upper member 38. The lower flat end 62 of casing 60 rests on the upper end of lower member 23 without blocking the radial grooves 34 in the upper end of the lower member 23. The external surface 64 of the casing 60 includes a plurality of longitudinal grooves 66 extending throughout the length of the casing 60 to provide air and pressure flow communication between the tire 20 and the passageway 58 through the passageway 36, the radial grooves 34, and the longitudinal grooves 66. This communication permits inflation or deflation of the tire 20 while the monitor 16 is mounted on the valve stem 19. The upper end portion of casing 60 is internally threaded at 68 for threaded engagement with a cap 70 which forms a closure for the upper end of casing 60. The cap 70 preferably includes a transverse groove 72 in its upper surface to enable a screwdriver or other similar tool to assemble or remove the cap in relation to the casing 60. The lower flat end 62 of casing 60 includes a short depending projection 74 having a passageway 76 therethrough which communicates the hollow interior 78 of casing 60 with passageway 36 in lower member 23 and thus with the tire 20.

Positioned within the interior 78 of casing 60 is a radio frequency transmitter 80, battery 82 and air pressure sensor 84, preferably in the form of circular wafers oriented in stacked relation as schematically shown in FIGS. 3 and 5. The battery 82 provides a power source to actuate the transmitter 80 when the sensor 84 senses an unsafe air pressure in the tire 20. Attached to the transmitter 80 is a flexible antenna wire 86 which extends downwardly through the passageway 76 into the tire 20 a distance to enable an antenna 88 to transmit a signal to actuate the indicator 10 corresponding to the tire 20 on which the monitor 16 is mounted to warn the vehicle operator of unsafe tire pressure in a specific tire 20.

The separable components of the housing 22 enable replacement of the battery 82 and inspection and replacement of the sensor 84 and transmitter 80, if necessary. The housing components are preferably constructed of lightweight plastic material to enable effective balancing of the vehicle wheels. Also, the interior of the casing 60 may be sealed with epoxy or the like with the entire casing and components to be replaced as a single unit.

Each transmitter 80 and antenna 88 are located in the tire 20 in a position that the metal wheel components will not interfere with radio transmission of a wireless radio frequency signal having a frequency associated with the particular tire 20 with which the valve stem 19 is associated. The signal from the transmitter is received by the indicator 10 that includes a receiver tuned to receive the radio frequency signal transmitted from the transmitter 80. Each indicator 10 receives a signal from only the transmitter 80 to which the indicator 10 is assigned inasmuch as the transmitter 80 and receiver in the indicator 10 are tuned to the same radio frequency. This enables each indicator 10 to be assigned or relate to an individual tire 20 on the vehicle so that the vehicle operator can immediately determine the inflation condition in each tire on the vehicle.

Each indicator 10 in accordance with the present invention includes a visual signal, such as a green light to indicate safe tire pressure and a red light to indicate an unsafe air pressure. The visual signal can be constant or flashing with preferably the green light being constant and the red light flashing. It is within the scope of the present invention to include other types of signals such as audible signals which are clearly recognizable and of sufficient volume to enable a vehicle operator to hear the audible signals above the usual noises associated with vehicle operation.

In operation, as long as all of the vehicle tires 20 are properly inflated for safe operation of the vehicle, all indicators 10 will indicate that safe operating conditions exist in all tires. However, if one or more tires lose air pressure to a level that is unsafe for continuous operation of the vehicle, then the signal changes to indicate unsafe air pressure in readily identifiable tires thereby enabling the vehicle operator to take immediate action to remedy the unsafe operating condition.

Typically, the transmitter will continue to indicate safe operating conditions if the air pressure in the tire remains within about 5% to 10% of the recommended air pressure. For example, if heavy truck tire pressure is recommended to be 100 psi, the transmitter would not transmit a signal until the air pressure in the tire reduces to approximately 90 psi. In a passenger car where the recommend pressure may be 35 psi, the transmitter will transmit a signal when the tire pressure reduces to approximately 31 or 32 psi. The percent reduction in pressure from the recommended pressure to the signal transmitting pressure can be varied depending upon the vehicle and the criticality of the air pressure with regard to possible overheating of the tire, extra tire wear, tread separation and the like, which can result in the vehicle operator losing control of the vehicle and causing accidents resulting from serious deterioration of the handling characteristics of the vehicle due to tire failure.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A vehicle tire air pressure monitor comprising a pressure sensitive radio frequency transmitter adapted to be mounted on each tire on a vehicle and in communication with the tire internal air pressure for transmitting a wireless signal identifying the tire and air pressure, and indicators adapted to be mounted in a vehicle, each indicator adapted to be mounted in position for signaling to a vehicle operator the tire and air pressure condition of each tire to enable a vehicle operator to determine whether the air pressure in each tire is in the range of air pressure for safe operation of the vehicle or in the range of air pressure for unsafe operation of the vehicle, said transmitter including an antenna oriented internally of the tire for transmitting a signal indicating the air pressure conditions therein to said indicator, said monitor mounted on each tire including a housing, said housing including an internally threaded lower end threadedly engaged with an outer threaded end of a valve stem from which the valve has been removed, a valve in an outer end of said housing, a passageway in said housing in communication with said valve in the outer end of said housing, said valve stem and the interior of a tire to enable inflation and deflation of a vehicle tire through said passageway from the outer end of said housing while the housing is mounted on a valve stem, said transmitter, a battery and a pressure sensor mounted in said housing in communication with said passageway, and an antenna connected with said transmitter and extending through said passageway into the tire for transmitting a radio frequency signal to an indicator for indicating air pressure condition in the tire.

2. The monitor as defined in claim 1, wherein each indicator is a visually observable illuminated indicator.

3. The monitor as defined in claim 2, wherein each indicator includes a pair of lights of different colors with one color indicating safe air pressure and another color indicating unsafe air pressure.

4. The monitor as defined in claim 3, wherein said pair of lights for each indicator include a green light and a red light, said transmitter and receiver associated with each tire maintaining the green light energized when the tire pressure is within a safe range and de-energizing the green light and energizing the red light when the tire pressure is, in an unsafe range.

5. The monitor as defined in claim 1, wherein each indicator produces an audible signal.

6. The monitor as defined in claim 1, wherein each transmitter and indicator operate on a selected radio frequency wireless signal.

7. The monitor as defined in claim 1, wherein said housing includes separable components to enable replacement of the battery.

8. The monitor of claim 7, wherein said antenna includes a flexible wire extending through the valve stem into the tire being monitored and positioned in spaced relation to metal wheel components to reduce interference with signal transmission.

9. The monitor of claim 8, wherein centrifugal force produced by rotation of each tire will maintain the antenna spaced from a wheel rim.

10. The monitor as defined in claim 1 wherein said housing includes two tubular members that are telescopically and threadably interconnected with the lower tubular member including an internally threaded lower end for threaded engagement with a valve stem and the upper tubular member including said valve at the other end of said housing, said lower tubular member including an externally threaded upper end and said upper tubular member including an internally threaded lower end in threaded engagement with said lower tubular member, said upper tubular member of the housing including a cylindrical tubular casing engaging an upper end of the lower tubular member, the external surface of said casing including longitudinal grooves extending throughout the length thereof to enable air passage, the upper end of said lower tubular member including radial grooves with the grooves on the exterior of the casing and the grooves on the upper end of the lower tubular member forming a continuous passageway from said upper tubular member to said lower tubular member, said transmitter battery and air pressure sensor being in the form of circular wafers oriented in stacked relation within said casing, said antenna being connected to said transmitter and extending through an opening in the lower end of said casing, an upper end of said casing including a removable cap to retain the transmitter, battery and sensor in position and enabling removal and replacement of the transmitter, battery or sensor by separating the tubular members and removing the casing cap.

* * * * *